United States Patent
Hidaka et al.

(10) Patent No.: US 9,249,476 B2
(45) Date of Patent: Feb. 2, 2016

(54) ROLLING BEARING

(71) Applicant: NSK LTD., Tokyo (JP)

(72) Inventors: Hideyuki Hidaka, Fujisawa (JP);
Daisuke Watanuki, Fujisawa (JP);
Kazuki Tamura, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/439,016

(22) PCT Filed: Aug. 7, 2013

(86) PCT No.: PCT/JP2013/071421
§ 371 (c)(1),
(2) Date: Apr. 28, 2015

(87) PCT Pub. No.: WO2014/069068
PCT Pub. Date: May 8, 2014

(65) Prior Publication Data
US 2015/0259764 A1    Sep. 17, 2015

(30) Foreign Application Priority Data

Oct. 29, 2012  (JP) ................. 2012-238231
Nov. 1, 2012   (JP) ................. 2012-241822
Nov. 1, 2012   (JP) ................. 2012-241823
Jul. 22, 2013  (JP) ................. 2013-151873
Jul. 23, 2013  (JP) ................. 2013-152358

(51) Int. Cl.
*F16C 33/62*    (2006.01)
*F16C 33/64*    (2006.01)
*C21D 9/40*     (2006.01)
*C22C 38/00*    (2006.01)
(Continued)

(52) U.S. Cl.
CPC . *C21D 9/40* (2013.01); *C22C 38/00* (2013.01);
*C22C 38/02* (2013.01); *C22C 38/04* (2013.01);
(Continued)

(58) Field of Classification Search
CPC ............ F16C 33/62; F16C 33/64; C21D 9/40
USPC ........... 148/333–335; 420/108, 112; 384/492, 384/625
See application file for complete search history.

(56) References Cited

U.S. PATENT DOCUMENTS 7,422,643 B2 * 9/2008 Takayama ................ C21D 1/10
148/218
2007/0194504 A1    8/2007 Nakashima et al.

FOREIGN PATENT DOCUMENTS

JP    10226817 A    8/1998
JP    2004011712 A  1/2004
(Continued)

OTHER PUBLICATIONS

ISR (PCT/ISA/210) issued Oct. 8, 2013, by the ISA in related International Application No. PCT/JP2013/071421.
(Continued)

Primary Examiner — Phillip A Johnson
(74) Attorney, Agent, or Firm — Sughrue Mion, PLLC

(57) ABSTRACT

In the rolling bearing of the present invention, at least one of the bearing rings is obtained by applying a induction heat treatment to a spheroidizing annealed steel material having a DI value of 1.0 or more to form a hardened layer having a hardness of 550 HV or more on at least a raceway surface and a fitting surface, and in the induction heat-treated bearing ring, (A) an average retained austenite amount is 12 vol % or less, (B) the raceway surface has a retained austenite amount of 12 vol % or more and a residual compressive stress of −100 MPa or less, and (C) a difference between a hardness of the raceway surface and a minimum hardness of a region having a hardness of less than 550 HV is 150 HV or more.

4 Claims, 2 Drawing Sheets

(51) Int. Cl.
  *C22C 38/44*    (2006.01)
  *F16C 33/58*    (2006.01)
  *C22C 38/02*    (2006.01)
  *C22C 38/04*    (2006.01)
  *F16C 19/26*    (2006.01)
  *F16C 19/38*    (2006.01)
  *F16C 19/36*    (2006.01)
  *C21D 1/09*     (2006.01)

(52) U.S. Cl.
  CPC ............... *C22C 38/44* (2013.01); *F16C 33/585* (2013.01); *F16C 33/62* (2013.01); *F16C 33/64* (2013.01); *C21D 1/09* (2013.01); *F16C 19/26* (2013.01); *F16C 19/364* (2013.01); *F16C 19/38* (2013.01); *F16C 2202/04* (2013.01); *F16C 2240/40* (2013.01)

(56) References Cited

FOREIGN PATENT DOCUMENTS

| | | | |
|---|---|---|---|
| JP | 4208426 | A | 1/2009 |
| JP | 2009270172 | A | 11/2009 |
| JP | 2012162799 | A | 8/2012 |
| JP | 2012182799 | A * | 9/2012 |

OTHER PUBLICATIONS

Written Opinion (PCT/ISA/237), issued Oct. 8, 2013, by the ISA in related International Application No. PCT/JP2013/071421.

Search Report dated Nov. 13, 2015, issued by the European Patent Office Action in counterpart European Application No. 13852223.0.

* cited by examiner

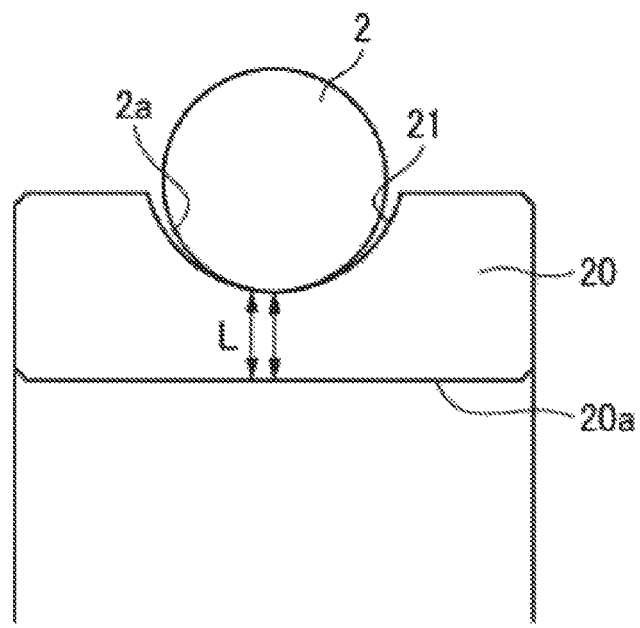

ROLLING BEARING

TECHNICAL FIELD

The present invention relates to a rolling bearing. More particularly, the present invention relates to a rolling bearing for use in applications where a high load or an impact load is imposed, such as wind power generator, construction machine, iron-steel plant and industrial robot.

BACKGROUND ART

Lifetime and toughness are required for a rolling bearing. Particularly, the balance of both properties is important to a rolling bearing for use in applications where a high load or an impact load is imposed, such as wind power generator, construction machine, iron-steel plant and industrial robot.

The rolling lifetime of a bearing depends on reasons which are roughly classified into internally originating-type flaking and surface originating-type flaking. The internally originating-type flaking originates from a nonmetallic inclusion contained in a steel material, and therefore, a technique of reducing the oxygen amount in a steel material is employed for prolonging the lifetime. The oxygen amount has been heretofore reduced by various improvements of the iron and steel process, and a large carbon amount in chemical components is known to be desirable for reducing the oxygen amount, and a bearing steel represented by SUJ2 exhibits high cleanliness, compared with S53C that is a medium-carbon steel.

In the surface originating-type flaking, flaking occurs due to stress concentration on the edge of an indentation produced by the engagement with a foreign substance such as metal powder contained in oil, and for the purpose of relieving the stress concentration, the retained austenite amount is controlled to thereby prolong the lifetime. In general, the surface originating-type flaking apparently shortens the bearing lifetime, compared with the internally originating-type flaking, and the development of a long-lifetime bearing is often related to the reduction in the surface originating-type flaking. However, a carbon- or nitrogen-enriched region must be formed on the surface so as to generate a large amount of retained austenite and in turn, a quenching treatment in a special gas atmosphere, such as carburizing or carbonitriding, is required. Furthermore, an expensive alloy element such as Mo is added in many cases, because precipitation of a large amount of retained austenite gives rise to a decrease in the surface hardness most needed for a rolling bearing and this must be compensated for by a hard carbonitride.

On the other hand, toughness is in a trade-off relationship with hardness of a material, and a basic approach for enhancing the toughness is to ensure as many low-hardness regions as possible. From such a viewpoint, a carburized bearing obtained by subjecting a low/medium carbon steel to a carburizing or carbonitriding treatment to harden only the surface has been developed. However, at present, a carburized steel is used in many cases for a relatively large bearing such as bearing for iron and steel plants, and the quenching property is ensured principally by the addition of an expensive alloy element such as Ni, Mo and Cr, incurring a rise in the production cost, in addition to cumbersomeness of a heat treatment such as carburizing treatment.

Under such background, hardening only the surface of a steel material by induction heating is also proposed (see, for example, Patent Documents 1 and 2). The induction heating allows, within the single same part, a hardened layer capable of withstanding a high surface pressure to exist on the surface and an unhardened layer excellent in the toughness to exist in the inside (core part), whereby a bearing satisfying both lifetime and toughness is obtained.

BACKGROUND ART DOCUMENT

Patent Document

Patent Document 1: JP-A-2009-270172
Patent Document 2: JP-B-4208426

SUMMARY OF THE INVENTION

Problem to be Solved by the Invention

However, in the conventional rolling bearing, as in Patent Document 1, only the raceway surface is hardened by induction heating, and other portions still remain soft. Therefore, utmost care must be taken in the assembly, and this directly leads to a drop in the productivity of the product. In addition, the bearing is generally used by incorporating it into a housing and in order to suppress deformation due to a load, the gap between the housing and the bearing is minimized. Therefore, for example, in the case of incorporating the outside surface of an outer ring into a housing, when the outside surface of the outer ring has a scratch, the area around the scratch is elevated, and incorporation into a housing becomes very difficult.

Furthermore, the induction heat treatment is, as in Patent Document 2, applied to a bearing ring using a low alloy steel such as S53C and, particularly, an alloy component causing an enrichment of Cr or the like in carbide and inhibiting the dissolution of carbon tends to be avoided. A region having dissolved therein a large amount of carbon is advantageous in that retained austenite remains and residual stress by compression is likely to be maintained, but such an effect is not obtained with a low alloy steel such as S53C.

Accordingly, an object of the present invention is to provide a rolling bearing excellent in both lifetime and toughness and capable of being used as a rolling bearing for use in applications where a high load or an impact load is imposed, such as wind power generator, construction machine and industrial robot.

Means for Solving the Problem

In order to attain the object above, the present invention provides the following rolling bearing.
(1) A rolling bearing including one or more parts of a pair of bearing rings and a rolling element, wherein:
at least one of the bearing rings is obtained by applying a induction heat treatment to a spheroidizing annealed steel material having a DI value represented by the following formula (1) of 1.0 or more to form a hardened layer having a hardness of 550 HV or more on at least a raceway surface and a fitting surface, and
in the induction heat-treated bearing ring, (A) an average retained austenite amount is 12 vol % or less, (B) the raceway surface has a retained austenite amount of 12 vol % or more and a residual compressive stress of −100 MPa or less, and (C) a difference between a hardness of the raceway surface and a minimum hardness of a region having a hardness of less than 550 HV is 150 HV or more, $$DI = D0 \times fSi \times fMn \times fNi \times fCr \times fMo \tag{1}$$

$$D0 = 0.2 \times (C) + 0.14$$

$$fSi = 1 + 0.64 \times (Si)$$

$$f_{Mn} = 1 + 4.1 \times (Mn)$$

$$f_{Ni} = 1 + 0.52 \times (Ni)$$

$$f_{Cr} = 1 + 2.33 \times (Cr)$$

$$f_{Mo} = 1 + 3.14 \times (Mo)$$

where (C), (Si), (Mn), (Ni), (Cr) and (Mo) are the contents (mass %) of respective elements in the steel material.

(2) The rolling bearing as described in (I), wherein the steel material contains from 0.7 to 1.1 mass % of C, from 0.15 to 0.7 mass % of Si, from 0.01 to 1.15 mass % of Mn, from 0.9 to 1.6 mass % of Cr, from 0 to 2.0 mass % of Mo, and from 0 to 2.0 mass % of Ni, with the balance being iron and unavoidable impurities.

(3) The rolling bearing as described in (1) or (2), wherein when, in the raceway surface of the induction heat-treated bearing ring, a depth of the region having the hardness of 550 HV or more is $Y_0$ (mm), an average thickness of a region coming into contact with the rolling element is T (mm), a thickness of the region having the hardness of less than 550 HV is W (mm), in an opposite-raceway surface, a depth of a region having a hardness of 550 HV or more is $Y_0'$ (mm), and a diameter of the rolling element is $D_w$ (mm), the rolling bearing satisfies all of (a) $Y_0 \geq 0.07 D_w$
(b) $Y_0 > Y_0'$
(c) $Y_0/T \leq 30\%$
(d) $W/T \geq 55\%$.

In the following description, the "region having the hardness of less than 550 HV" is also referred to as a "core part".

Effects of the Invention

In the rolling bearing of the present invention, a spheroidizing annealed steel material having a carbon content of 0.7 mass % or more is used for the bearing ring material, a hardened layer having specific physical properties is formed by a induction heat treatment only on the raceway surface, the fitting surface and a contact part with a seal, and a non-hardened layer remains in the core part, so that the lifetime and toughness are excellent. Accordingly, even when the rolling bearing is used in applications where a high load or an impact load is imposed, such as wind power generator, construction machine and industrial robot, its lifetime can be extended by suppressing generation of flaking

BRIEF DESCRIPTION OF THE DRAWINGS

FIGS. 1A to 1C are views for explaining the method for specifying the thickness T of the bearing ring, wherein FIG. 1A shows a cylindrical roller bearing, FIG. 1B shows a tapered roller bearing, and FIG. 1C shows a self-aligning roller bearing.

FIG. 2 is a view for explaining the method for specifying the thickness T of the bearing ring in a ball bearing.

DETAILED DESCRIPTION OF EMBODIMENTS

Figure 1A:
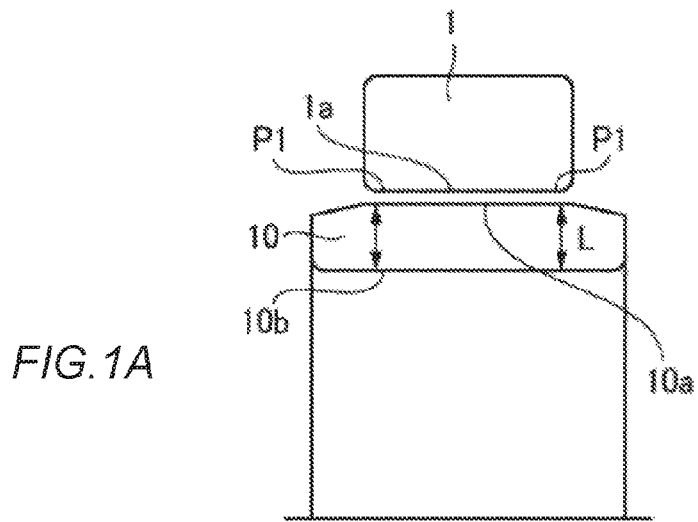

The present invention is described in detail below by referring to the drawings.

In the rolling bearing of the present invention, a plurality of rolling elements are rotatably held between a pair of bearing rings, and a hardened layer with a hardness of 550 HV or more is formed by induction heating on at least a raceway surface and a fitting surface of either one bearing ring, preferably of both bearing rings.

As described above, conventionally, a induction heat treatment is applied only to the raceway surface and, for example, the outside surface of an outer ring used for incorporation into a housing is not hardened, whereas in the present invention, a hardened layer by induction heating is formed on a fitting surface, in addition to the raceway surface, and is preferably further formed on a contact portion with a seal for encapsulating a lubricating oil or a lubricant such as grease or on the entire surface of the bearing ring.

As the starting material of the bearing ring, a spheroidizing annealed steel material having a carbon amount of 0.7 mass % or more is preferably used. The present invention mainly targets a large rolling bearing for use in a wind power generator, a construction machine, an industrial robot, etc., specifically, a rolling bearing in which the outer diameter of the outer ring is 180 mm or more. Generally, when the bearing becomes large, the rolling element also becomes large and in turn, a high shear stress is produced, inevitably leading to an increase in the required quenching depth. However, when the hardened layer becomes deep, the residual compressive stress near the surface tends to be once increased and then restored. In the case of a medium carbon steel (carbon amount: from 0.30 to 0.45 mass %), when carbide is entirely dissolved by exposure to a certain temperature or more, no more change occurs in view of components of austenite. On the other hand, a high carbon steel with a large carbon content is assured of sufficient carbon supply and moreover, in the region having dissolved therein a large amount of carbon, retained austenite remains, making it easy to maintain the residual compressive stress. For this reason, in the present invention, the carbon amount is preferably 0.7 mass % or more, more preferably 0.95 mass % or more, so as to ensure the retained austenite amount. However, in order to suppress generation of a huge carbide, the carbon amount is preferably 1.2 mass % or less, more preferably 1.1 mass % or less.

The balance may be unavoidable impurities but in order to ensure the quenching property, the steel material preferably contains from 0.1 to 2.0 mass % of Si, from 0.01 to 2.0 mass % of Mn, and from 0.1 to 2.0 mass % of Cr, and in the case of lacking the quenching property, more preferably further contains 2 mass % or less of Mo and 2.0 mass % or less of Ni.

The content of Si is preferably 0.1 mass % or more, more preferably 0.15 mass % or more, so as to ensure the quenching property, but if the content exceeds 2.0 mass %, the cutting characteristics are deteriorated. In order to suppress the deterioration of cutting characteristics, the content is preferably 0.7 mass % or less.

The content of Mn is preferably 0.01 mass % or more so as to ensure the quenching property, but if the content exceeds 2.0 mass %, the cutting characteristics are deteriorated. In order to suppress the deterioration of cutting characteristics, the content is preferably 1.15 mass % or less.

The content of Cr is preferably 0.1 mass % or more, more preferably 0.9 mass % or more, so as to ensure the quenching property, but if the content exceeds 2.0 mass %, the cutting characteristics are deteriorated. In order to suppress the deterioration of cutting characteristics, the content is preferably 1.6 mass % or less.

Furthermore, by adding Mo in an amount of 2.0 mass % or less, the processability is enhanced, and the cost can be kept low. In addition, by adding Ni in an amount of 2.0 mass % or less, the cost can be kept low.

That is, a steel material composition is preferred to containing C: from 0.7 to 1.1 mass %. Si: from 0.15 to 0.7 mass %. Mn: from 0.01 to 1.15 mass %, Cr: from 0.9 to 1.6 mass %, Mo: from 0 to 2.0 mass %, and Ni: from 0 to 2.0 mass %, with the balance being iron and unavoidable impurities, is preferred, among others.

Furthermore, the DI value represented by the following formula (1) of the steel material is 1.0 or more. In the following, (C), (Si), (Mn), (Ni), (Cr) and (Mo) are the contents (mass %) of respective elements in the steel material.

$$DI = D0 \times fSi \times fMn \times fNi \times fCr \times fMo \quad (1)$$

$$D0 = 0.2 \times (C) + 0.14$$

$$fSi = 1 + 0.64 \times (Si)$$

$$fMn = 1 + 4.1 \times (Mn)$$

$$fNi = 1 + 0.52 \times (Ni)$$

$$fCr = 1 + 2.33 \times (Cr)$$

$$fMo = 1 + 3.14 \times (Mo)$$

A DI value indicates the ease of quenching, and a low DI value indicates poor quenching property. When the DI value is 1.0 or more, preferably 2.1 or more, the quenching property by induction heating is improved.

Incidentally, SUJ2, SUJ3, etc. are available on the market as the steel material satisfying the above-described composition.

In addition, fine spherodized carbide is dispersed in the matrix by applying a spheroidizing annealing treatment, and a fine structure is maintained by the pinning effect of the carbide.

In the present invention, a bearing ring obtained by machining a spheroidizing annealed steel material having the above-described composition into a predetermined shape is subjected to induction heating to form a hardened layer, and in the bearing ring having formed thereon a hardened layer, the average retained austenite amount is set to 12 vol % or less. The retained austenite is known to gradually transform to martensite during use of the bearing and expand the dimension due to the density difference. When the average value of the retained austenite amount in the entire bearing ring having formed thereon a hardened layer is kept low to 12 vol % or less, the dimensional change amount at the time of transformation to martensite can be maintained at a level equal to or greater than that in the bearing hardened by general furnace heating.

In the bearing ring having formed thereon a hardened layer, the raceway surface has retained austenite of 12 vol % or more and a residual compressive stress of −100 MPa or less. If the retained austenite of the raceway surface is less than 12 vol %, surface originating-type flaking occurs due to a lack of hardness particularly in a lubricating environment allowing the mixing of a foreign substance. In order to more unfailingly prevent such surface originating-type flaking, the retained austenite of the raceway surface is set to 18 vol % or more.

The residual compressive stress is related to the effect of retarding generation and development of cracks, and when the residual compressive stress is −100 MPa or less, an effect is found on the lifetime extension. Furthermore, white structure flaking due to intrusion of hydrogen sometimes occurs generally in a shorter time than the calculated lifetime, and therefore, when the residual compressive stress is −200 MPa or less, the lifetime reduction due to white structure flaking can be effectively suppressed, as a result, an effect of further extending the lifetime is obtained.

In addition, in the bearing ring having formed thereon a hardened layer, the difference in hardness between the raceway surface and the core part is 150 HV or more. The mechanism of producing a residual compressive stress by induction heat treatment is basically attribute to the fact that the surface is heated to an austenite region and the core part remains untransformed. Furthermore, even when the induction heat treatment time is long and the surface is heated until the core part is austenized, since the temperature of the core part is lower than the temperature of the surface, the structure of the core part becomes a pearlite, bainite or low-carbon martensite structure, and a residual stress by compression is produced due to the difference from the structure of the surface. That is, the surface and the core part must be greatly different in the structure, and when the hardness difference between the raceway surface and the core part is 150 HV or more, preferably 280 HV or more, a residual compressive stress by compression necessary for prolonging the lifetime can be ensured.

However, the residual compressive stress is generated to cancel each other between the compression section undertaken by the surface layer and the tension section undertaken by the core part, and therefore, from two aspects of effectively utilizing the residual stress by compression in the surface layer and reducing the harmfulness of the residual stress by tension in the core part, an appropriate balance is required. To this end, a hardened layer depth according to the shear stress distribution is necessary so as to ensure, in the raceway surface, durability against the rolling fatigue. In the section where wear resistance and scratch resistance are required, such as a fitting surface, the hardened layer must be kept from becoming unnecessarily thick. For this purpose, it is preferred to satisfy the following relationships (a) to (d).

That is, when in the raceway surface, the depth of the region having a hardness of 550 HV or more is $Y_0$ (mm), an average thickness of a region coming into contact with a rolling element is T (mm), a thickness of the region having a hardness of less than 550 HV is W (mm), in the opposite-raceway surface, the depth of a region having a hardness of 550 HV or more is $Y_0'$ (mm), and the diameter of the rolling element is $D_w$ (mm), the rolling bearing preferably satisfies all of (a) $Y_0 \geq 0.07 D_w$
(b) $Y_0 > Y_0'$
(c) $Y_0/T \leq 30\%$
(d) $W/T \geq 55\%$.

As for $Y_0$, after the induction heat-treated bearing ring is cut in the thickness direction and the cross-section is scanned by a Vickers hardness tester from the surface toward the inside of the raceway surface, the distance (depth) of the region having a hardness of 550 HV or more from the surface may be determined. As for $Y_0'$, the distance (depth) from the surface opposite the raceway surface (in the case of an inner ring, the inner-ring inside surface, and in the case of an outer ring, the outer-ring outside surface) to the region having a hardness of 550 HV or more may be determined. The remaining part is W.

Figure 1B:
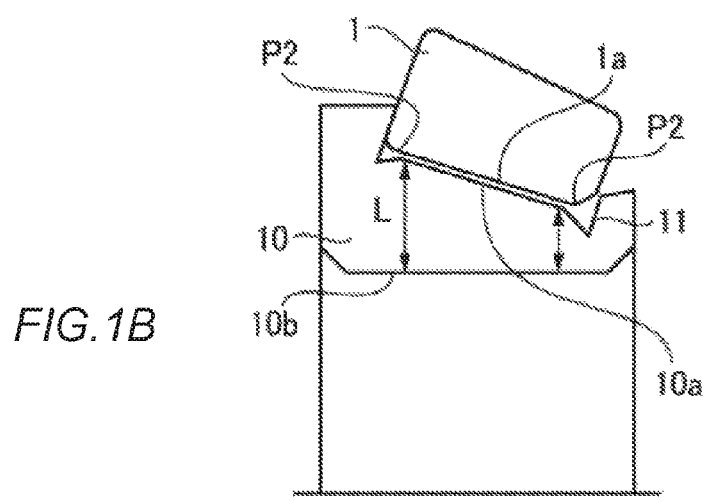
Figure 1C:
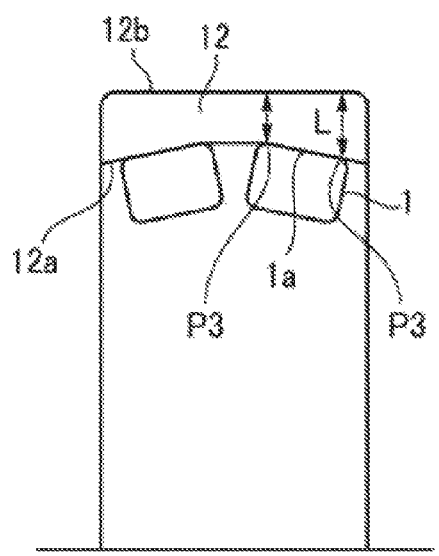

Herein, T is specified as follows. In FIG. 1A illustrating a case where an effective hard layer is formed on the outside surface 10a of an inner ring 10 in a cylindrical roller bearing, a perpendicular line L is drawn in the inner ring 10 from the R part-side both ends P1 of the rolling surface 1a of a roller 1 the distance from the inner-ring outside surface 10a to the inner-ring inside surface 10b of the perpendicular line L is measured, and the average value thereof is taken as T. In FIG. 1B illustrating a case where an effective hard layer is formed on the outside surface 10a of an inner ring 10 in a tapered roller bearing, a perpendicular line L is drawn in the inner ring 10 from the widthwise both ends P2 coming into contact with the rolling surface 1a of a roller 1 in the region excluding a clearance groove 11 of the inner-ring outside surface 10a, the distance from the inner-ring outside surface 10a to the inner-ring inside surface 10b of the perpendicular line L is measured, and the average value thereof is taken as T. In FIG. 1C illustrating a case where an effective hardened layer is formed on the inside surface 12a of an outer ring 12 in a self-aligning roller bearing, a perpendicular line L is drawn in the outer ring 12 from the R part-side both ends P3 of the rolling surface 1a of a roller 1 in the inside surface 12a of the outer ring 12, the distance from the outer-ring inside surface 12a to the outer-ring outside surface 12b of the perpendicular line L is measured, and the average value thereof is taken as T.

Furthermore, as shown in FIG. 2, in a ball bearing, the rolling surface 2a of a ball 2 comes into point contact with the raceway groove 21 of an inner ring 20, and therefore, an average value of the distance (L) from the deepest part of the raceway groove 21 and the vicinity thereof to the inner-ring inside surface 20a is taken as T.

In induction heating, a heating coil is disposed to face a portion to be hardened, and a high-frequency current is flowed to the heating coil to cause induction heating, as a result, the heated portion is hardened over a certain depth. In the present invention, the heating coil is disposed to face the raceway surface of the bearing ring and the fitting surface (opposite-raceway surface) as well as the contact portion with a seal, preferably to face the entire surface of the bearing ring, and the above-described hardened layer is formed by adjusting the output of the heating coil, the treatment time, etc.

EXAMPLES

The present invention is further described below by referring to Examples and Comparative Examples, but the present invention is not limited thereto.

Examples 1 to 3 and Comparative Examples 1 and 2

Each of steel materials having alloy compositions shown in Table 1 was prepared, subjected to a spheroidizing annealing treatment, machined to produce a race of a thrust bearing 51305, and then induction heat-treated under the following heating conditions to form a hardened layer on the race surface. The DI value was calculated according to formula (1). Furthermore, the race surface was electrolytically polished by about 10 μm, and the polished surface was structurally analyzed by X-ray diffraction method to determine the volume fraction of austenite phase (retained austenite amount). The results are shown in Table 1.

<Heating Conditions>
Frequency: 10 kHz
Heating time: from 10 to 30 seconds
Tempering: 2 hours at 180° C.

Also, after the polishing, a lifetime test was performed under the following conditions. The results are shown by a relative value (lifetime ratio) to Comparative Example 1 in Table 1.

<Life Test Conditions>
Contact surface pressure: 2.8 GPa
Rotation speed: 1,000 min$^{-1}$
Lubrication: VG68, oil bath lubrication
Foreign substance: 200 pm of a powder of about HV850 and from 74 to 147 μm was added to VG68

TABLE 1

| | C Content (mass %) | Si Content (mass %) | Mn Content (mass %) | Ni Content (mass %) | Cr Content (mass %) | Mo Content (mass %) | DI Value | Retained γ (vol %) | Lifetime Ratio (—) |
|---|---|---|---|---|---|---|---|---|---|
| Comparative Example 1 | 0.53 | 0.25 | 0.80 | 0.08 | 0.16 | 0.01 | 1.7 | 6 | 1.0 |
| Comparative Example 2 | 0.71 | 0.25 | 0.20 | 0.08 | 0.16 | 0.01 | 0.9 | 13 | 0.4 |
| Example 1 | 0.70 | 0.25 | 0.81 | 0.09 | 0.18 | 0.01 | 2.1 | 12 | 2.0 |
| Example 2 | 0.96 | 0.19 | 0.27 | 0.08 | 1.37 | 0.01 | 3.4 | 18 | 2.8 |
| Example 3 | 1.03 | 0.55 | 1.03 | 0.07 | 1.05 | 0.01 | 8.7 | 25 | 3.2 |

Note:
The lifetime ratio is a relative value to Comparative Example 1.

In Comparative Example 1, the carbon amount and the retained austenite amount fell below respective ranges specified in the present invention, and flaking originated from a foreign substance indentation was generated. In Comparative Example 2, the carbon amount and the retained austenite amount each specified in the present invention were satisfied, but early flaking was generated, and the lifetime was short compared with Comparative Example 1. When the flaking was observed, internally-originated flaking was generated, and this is considered to be caused because a fracture occurred from the inside due to a lack of quenching property. In addition, the DI value was determined and found to be 0.9. That is, it is seen from Comparative Example 2 that a quenching property of 1.0 or more in terms of DI value is necessary for suppressing the internally originating-type flaking.

On the other hand, in Examples 1 to 3 according to the present invention, the lifetime can be greatly extended. Although the type of flaking was surface originating-type flaking originated from a foreign substance indentation, similarly to Comparative Example 1, it is understood that in a lubricating environment allowing the mixing of a foreign substance, a quenching property high enough to prevent internally originating-type flaking from occurring due to a lack of hardness must be ensured (in terms of DI value, 1.0 or more, preferably 2.1 or more) and the retained austenite amount must be 12 vol % or more.

Examples 4 to 7 and Comparative Examples 3 and 4

The steel material of Example 2 and the steel material of Example 3 correspond to SUJ2 and SUJ3, respectively. Here, a steel material obtained by applying a spheroidizing annealing treatment to SUJ2 or SUJ3 was machined to produce an inner ring of a cylindrical roller bearing NU2326 and further subjected, as shown in Table 2, to immersion quenching by furnace heating in Comparative Example 3 or induction heating under the above-described heating conditions in Comparative Example 4 and Examples 4 to 7. However, in Comparative Example 4 and Examples 4 to 7, the retained austenite amounts of raceway surface and core part, and the average retained austenite amount were adjusted to those shown in Table 2 by the processing conditions.

After keeping at a constant temperature of 130° C., the dimensional change amount was determined from the dimensions measured before and after heating. The results are shown by a relative value (dimensional change ratio) to Comparative Example 3 in Table 2.

TABLE 2

|  | Material | Heat Treatment | Retained γ (vol %) | | | Dimensional Change Ratio (—) |
|---|---|---|---|---|---|---|
|  |  |  | Raceway Surface | Core Part | Average |  |
| Comparative Example 3 | SUJ2 | furnace heating | 12 | 12 | 12 | 1.0 |
| Comparative Example 4 | SUJ3 | induction heating | 18 | 10 | 14 | 1.2 |
| Example 4 | SUJ3 | induction heating | 25 | 0 | 7 | 0.5 |
| Example 5 | SUJ3 | induction heating | 27 | 2 | 12 | 0.95 |
| Example 6 | SUJ3 | induction heating | 18 | 0 | 6 | 0.6 |
| Example 7 | SUJ3 | induction heating | 20 | 0 | 5 | 0.39 |

Note:
The dimensional change ratio is a relative value to Comparative Example 3.

In Comparative Example 3, a hardening treatment by standard furnace heating was applied, and the quality may be a standard quality. It is seen that the dimensional change amount is in good correlation with the average retained austenite amount and as long as the average retained austenite amount is 12 vol % or less, even when a large retained austenite amount of 12 vol % or more is ensured in the raceway surface, a dimensional change greater than that of a standard bearing is not caused.

Examples 8 to 11 and Comparative Examples 5 and 6

A steel material obtained by applying a spheroidizing annealing treatment to SUJ2 or SUJ3 was machined to produce an inner ring of a cylindrical roller bearing NU2326 and further subjected, as shown in Table 3, to immersion quenching by furnace heating in Comparative Example 5 or induction heating under the above-described heating conditions in Comparative Example 6 and Examples 8 to 11. However, in Comparative Example 6 and Examples 8 to 11, the hardness of each of the surface and the core part and the residual compressive stress of the raceway surface were adjusted to those shown in Table 3 by the processing conditions. Here, the surface hardness indicates a hardness at a position 0.2 mm deep from the surface of the raceway surface, and the core part surface indicates a lowest hardness irrespective of the measurement position. The residual compressive stress of the raceway surface was determined by the X-ray diffraction method.

A cylindrical roller bearing NU2326 was assembled using each of the inner rings and subjected to a lifetime test under the following conditions. The results are shown by a relative value (lifetime ratio) to Comparative Example 5 in Table 3.
<Life Test Conditions>
Load: surface pressure of 1.7 GPa
Rotation speed: 1,300 $min^{-1}$
Lubrication: special lubricating oil (oil with which white structure flaking is likely to occur)

TABLE 3

|  | Material | Heat Treatment | Surface Strength (HV) | Core Part Hardness (HV) | Hardness Difference (HV) | Residual Compressive Stress (MPa) | Life Ratio (—) |
|---|---|---|---|---|---|---|---|
| Comparative Example 5 | SUJ2 | furnace heating | 712 | 701 | 11 | 35 | 1.0 |
| Comparative Example 6 | SUJ3 | induction heating | 707 | 650 | 57 | −77 | 1.5 |
| Example 8 | SUJ3 | induction heating | 722 | 225 | 497 | −200 | 3.1 |
| Example 9 | SUJ3 | induction heating | 719 | 230 | 489 | −330 | 3.6 |
| Example 10 | SUJ3 | induction heating | 700 | 548 | 152 | −100 | 2.0 |
| Example 11 | SUJ3 | induction heating | 723 | 443 | 280 | −135 | 2.1 |

Note 1:
The surface hardness is a hardness at a depth of 0.2 mm from the surface, and the core part surface indicates a lowest hardness irrespective of the measurement position.
Note 2:
The lifetime ratio is a relative value to Comparative Example 5.

Comparative Example 5 is the same standard bearing as Comparative Example 3. The lifetime extending effect is in good correlation with the residual compressive stress, and when a residual compressive stress of −100 MPa or less (a residual stress by compression of 100 MPa or more) is imparted, a lifetime extending effect of 2 times or more relative to Comparative Example 5 is obtained. In particular, when the residual compressive stress is −200 MPa or less as in Examples 8 and 9, a lifetime extending effect exceeding 3 times is obtained. An oil that is likely to cause white structure flaking is used for the lubrication, but white structure flaking occurs generally in a shorter time than the calculated lifetime and therefore, setting the residual compressive stress to −200 MPa or less is thought to be effective also in suppressing the white structure flaking.

Furthermore, it was also revealed that the hardness difference between the surface and the core part needs to be 150 HV or more.

In addition, the dimensional stability was examined in the same manner as above by measuring the retained austenite amounts of the raceway surface and the core part and the average retained austenite amount, as a result, in Examples, the dimensional stability was also excellent.

TABLE 4

| | Material | Heat Treatment | Retained γ (vol %) | | |
|---|---|---|---|---|---|
| | | | Raceway Surface | Core Part | Average |
| Comparative Example 5 | SUJ2 | furnace heating | 12 | 12 | 12 |
| Comparative Example 6 | SUJ3 | induction heating | 18 | 10 | 14 |
| Example 8 | SUJ3 | induction heating | 25 | 0 | 7 |
| Example 9 | SUJ3 | induction heating | 20 | 0 | 5 |
| Example 10 | SUJ3 | induction heating | 28 | 6 | 11 |
| Example 11 | SUJ3 | induction heating | 26 | 4 | 6 |

Examples 12 to 22 and Comparative Examples 7 to 11

A material obtained by applying a spheroidizing annealing treatment to SUJ2 in Comparative Example 7, Comparative Example 8, Comparative Example 11 and Example 19 or SUJ3 in others was machined to produce an inner ring of a cylindrical roller bearing having the dimension specification shown in Table 5. In Table 5, d is the bearing inner diameter (mm), D is the bearing outer diameter (mm), and Fw is the inner-ring outer diameter (mm).

TABLE 5

| | d (mm) | D (mm) | Fw (mm) |
|---|---|---|---|
| NU221EM | 105 | 190 | 125 |
| NU2326M | 130 | 280 | 167 |
| NU344 | 220 | 460 | 284 |

Thereafter, immersion quenching by furnace heating was performed in Comparative Example 7, Comparative Example 8 and Comparative Example 11. In Examples, heating coils were disposed to face the raceway surface side and the opposite-raceway surface side (inner-ring inside surface), respectively, and the hardening state of the raceway surface and opposite-raceway surface was changed as shown in Table 6 by adjusting the output of each heating coil under the above-described heating conditions. In addition, a induction heat treatment was applied under the same conditions to the portion except for the raceway surface and opposite-raceway surface to form a hardened layer in all inner rings.

With regard to the inner rings produced, the cross-section was scanned by a Vickers hardness tester, and $Y_0$, $Y_0'$ and W were measured. Also, the residual compressive stress and crushing strength of the raceway surface were measured. The results are shown in Table 6, and the crushing strength is shown by a relative value (crushing strength ratio) to Comparative Example 7, Comparative Example 8 or Comparative Example 11.

TABLE 6

| | Bearing | Dw (mm) | 0.07 × Dw (mm) | T (mm) | $Y_0$ (mm) | $Y_0'$ (mm) | W (mm) | $Y_0$/T (%) | W/T (%) | Residual Compressive Stress (MPa) | Crushing Strength Ratio (—) Relative to Comparative Example 7 | Relative to Comparative Example 8 | Relative to Comparative Example 11 |
|---|---|---|---|---|---|---|---|---|---|---|---|---|---|
| Example 12 | NU221EM inner ring | 24 | 1.7 | 10 | 1.7 | 0.5 | 7.8 | 17 | 78 | −520 | 1.7 | — | — |
| Example 13 | | | | | 2.3 | 1.1 | 6.6 | 23 | 66 | −350 | 1.5 | — | — |
| Example 14 | | | | | 2.5 | 1.0 | 6.5 | 25 | 65 | −240 | 1.6 | — | — |
| Example 15 | | | | | 3.0 | 1.5 | 5.5 | 30 | 55 | −110 | 1.5 | — | — |
| Comparative Example 7 | | | | | through hardening | through hardening | — | — | — | −20 | 1.0 | — | — |
| Example 16 | NU2326M inner ring | 38 | 2.7 | 18.5 | 2.7 | 1.3 | 14.5 | 15 | 78 | −400 | — | 1.8 | — |
| Example 17 | | | | | 4.1 | 1.8 | 12.6 | 22 | 68 | −100 | — | 1.7 | — |
| Example 18 | | | | | 4.5 | 3.9 | 10.1 | 24 | 55 | −140 | — | 1.1 | — |
| Example 19 | | | | | 3.0 | 1.1 | 14.4 | 16 | 78 | −210 | — | 1.5 | — |
| Comparative Example 8 | | | | | through hardening | through hardening | — | — | — | 30 | — | 1.0 | — |
| Example 20 | | | | | 2.8 | 4.5 | 11.2 | 15 | 61 | −280 | — | 0.9 | — |
| Comparative Example 9 | | | | | 6.0 | 1.5 | 11.0 | 32 | 59 | −80 | — | 1.1 | — |
| Example 21 | NU344 inner ring | 56 | 3.9 | 32 | 4.2 | 2.1 | 25.7 | 13 | 80 | −450 | — | — | 1.5 |
| Example 22 | | | | | 6.9 | 3.3 | 21.8 | 22 | 68 | −120 | — | — | 1.5 |
| Comparative Example 10 | | | | | 8.0 | 7.5 | 16.5 | 25 | 52 | −60 | — | — | 1.0 |
| Comparative Example 11 | | | | | through hardening | through hardening | — | — | — | 20 | — | — | 1.0 |

In all of Comparative Examples 7, 8 and 11 where quenching was performed by furnace heating, the residual compressive stress of the raceway surface exceeded −100 MPa, and the crushing strength ratio thereto reveals that the strength is high in Examples where a hardened layer was formed by a induction heat treatment. In all of Examples, the residual compressive stress of the raceway surface was −100 MPa or less, and it is understood that the residual compressive stress of the raceway surface must be −100 MPa or less.

However, in Example 20, the crushing strength is slightly lower than the case where immersion quenching was performed. This is considered to result because the hardened layer of the opposite-raceway surface is thicker than the hardened layer of the raceway surface ($Y_0 < Y_0'$). In terms of the depth relationship between the hardened layer of the raceway surface and the hardened layer of the opposite-raceway surface, the crushing strength is remarkably enhanced by setting the depth of the hardened layer of the raceway surface to half or less the depth of the hardened layer of the opposite-raceway surface ($Y_0'/Y_0 \leq 0.5$).

In Comparative Example 9, it is considered that the residual compressive stress necessary for the surface in the raceway surface could not be ensured because the hardened layer of the raceway surface in the inner ring was too thick ($Y_0/T>30\%$). Furthermore, in Comparative Example 10, the required residual compressive stress could not be obtained because of the excessively thin core part ($W/T>55\%$), and the lifetime was short.

In Examples, the relationship between the depth ($Y_0$) of the hardened layer of the raceway surface and the diameter ($D_w$) of the cylindrical roller, i.e., "$Y_0 \geq 0.07 D_w$", was also satisfied.

While the invention has been described in detail and with reference to specific embodiments thereof, it will be apparent to one skilled in the art that various changes and modifications can be made therein without departing from the spirit and scope of the invention.

This application is based on Japanese Patent Application No. 2012-238231 filed on Oct. 29, 2012, Japanese Patent Application No. 2012-241822 filed on Nov. 1, 2012, Japanese Patent Application No. 2012-241823 filed on Nov. 1, 2012, Japanese Patent Application No. 2013-151873 filed on Jul. 22, 2013, and Japanese Patent Application No. 2013-152358 filed on Jul. 23, 2013, the contents of which are incorporated herein by reference.

Industrial Applicability

The rolling bearing of the present invention is suitable as a bearing for use in applications where a high load or an impact load is imposed, such as wind power generator, construction machine and industrial robot.

DESCRIPTION OF REFERENCE NUMERALS

1: Roller
1a: Rolling surface
10: Inner ring
10a: Inner-ring outside surface
10b: Inner-ring inside surface
12: Outer ring
12a: Outer-ring inside surface
12b: Outer-ring outside surface
2: Ball
2a: Rolling surface
20: Inner ring
21: Raceway groove
L: Perpendicular line

The invention claimed is:

1. A rolling bearing comprising one or more parts of a pair of bearing rings and a rolling element, wherein:
at least one of the bearing rings is obtained by applying a induction heat treatment to a spheroidizing annealed steel material having a DI value represented by the following formula (1) of 1.0 or more to form a hardened layer having a hardness of 550 HV or more on at least a raceway surface and a fitting surface, and
in the induction heat-treated bearing ring, (A) an average retained austenite amount is 12 vol % or less, (B) the raceway surface has a retained austenite amount of 12 vol % or more and a residual compressive stress of −100 MPa or less, and (C) a difference between a hardness of the raceway surface and a minimum hardness of a region having a hardness of less than 550 HV is 150 HV or more, $$DI = D0 \times fSi \times fMn \times fNi \times fCr \times fMo \quad (1)$$

$$D0 = 0.2 \times (C) + 0.14$$

$$fSi = 1 + 0.64 \times (Si)$$

$$fMn = 1 + 4.1 \times (Mn)$$

$$fNi = 1 + 0.52 \times (Ni)$$

$$fCr = 1 + 2.33 \times (Cr)$$

$$fMo = 1 + 3.14 \times (Mo)$$

where (C), (Si), (Mn), (Ni), (Cr) and (Mo) are contents (mass %) of respective elements in the steel material.

2. The rolling bearing according to claim 1, wherein the steel material contains from 0.7 to 1.1 mass % of C, from 0.15 to 0.7 mass % of Si, from 0.01 to 1.15 mass % of Mn, from 0.9 to 1.6 mass % of Cr, from 0 to 2.0 mass % of Mo, and from 0 to 2.0 mass % of Ni, with the balance being iron and unavoidable impurities.

3. The rolling bearing according to claim 2, wherein when, in the raceway surface of the induction heat-treated bearing ring, a depth of the region having the hardness of 550 HV or more is $Y_0$ (mm), an average thickness of a region coming into contact with the rolling element is T (mm), a thickness of the region having the hardness of less than 550 HV is W (mm), in an opposite-raceway surface a depth of a region having a hardness of 550 HV or more is $Y_0'$ (mm), and a diameter of the rolling element is $D_w$ (mm), the rolling bearing satisfies all of
(a) $Y_0 \geq 0.07 D_w$
(b) $Y_0 > Y_0'$
(c) $Y_0/T \leq 30\%$
(d) $W/T \geq 55\%$.

4. The rolling bearing according to claim 1, wherein when, in the raceway surface of the induction heat-treated bearing ring, a depth of the region having the hardness of 550 HV or more is $Y_0$ (mm), an average thickness of a region coming into contact with the rolling element is T (mm), a thickness of the region having the hardness of less than 550 HV is W (mm), in an opposite-raceway surface a depth of a region having a hardness of 550 HV or more is $Y_0'$ (mm), and a diameter of the rolling element is $D_w$ (mm), the rolling bearing satisfies all of
(a) $Y_0 \geq 0.07 D_w$
(b) $Y_0 > Y_0'$
(c) $Y_0/T \leq 30\%$
(d) $W/T \geq 55\%$.

* * * * *